US012696126B2

(12) United States Patent
Tran Le et al.

(10) Patent No.: US 12,696,126 B2
(45) Date of Patent: Jul. 28, 2026

(54) NETWORK COMMUNICATION THROUGH A HOST DEVICE

(71) Applicant: VODAFONE IP LICENSING LIMITED, Newbury (GB)

(72) Inventors: Mai Tran Le, Newbury (GB); Alan Law, Newbury (GB); Walter Bindrim, Newbury (GB)

(73) Assignee: VODAFONE IP LICENSING LIMITED, Newbury (GB)

( * ) Notice: Subject to any disclaimer, the term of this patent is extended or adjusted under 35 U.S.C. 154(b) by 588 days.

(21) Appl. No.: 17/906,462

(22) PCT Filed: Mar. 16, 2021

(86) PCT No.: PCT/EP2021/056644
§ 371 (c)(1),
(2) Date: Sep. 15, 2022

(87) PCT Pub. No.: WO2021/185819
PCT Pub. Date: Sep. 23, 2021

(65) Prior Publication Data
US 2023/0116879 A1 Apr. 13, 2023

(30) Foreign Application Priority Data
Mar. 16, 2020 (EP) ..................................... 20163410

(51) Int. Cl.
*H04W 28/02* (2009.01)
*H04W 88/04* (2009.01)
*H04W 88/06* (2009.01)

(52) U.S. Cl.
CPC ........ *H04W 28/0252* (2013.01); *H04W 88/04* (2013.01); *H04W 88/06* (2013.01)

(58) Field of Classification Search
CPC . H04W 28/0252; H04W 88/04; H04W 88/06; H04W 28/0247; H04W 76/12;
(Continued)

(56) References Cited

U.S. PATENT DOCUMENTS

2015/0264588 A1* 9/2015 Li ........................ H04W 56/002
370/350
2015/0326612 A1 11/2015 Faccin et al.
(Continued)

FOREIGN PATENT DOCUMENTS

CA 3056741 A1 * 9/2018 ........... H04L 5/0055
WO WO-2017107031 A1 * 6/2017 ......... H04L 41/0806
(Continued)

OTHER PUBLICATIONS

English translation of WO2017107031, 2017, Retrieved from PE2E Search Feb. 11, 2025.*
(Continued)

*Primary Examiner* — Syed Ali
(74) *Attorney, Agent, or Firm* — Workman Nydegger

(57) ABSTRACT

Communication between a client device and a host device using a first Radio Access Technology (RAT) may be configured. The host device communicates with a base station of a network using a second RAT, to provide services of the network to or from the client device. The communication between the host device and the base station distinguishes data traffic in accordance with a set of network traffic rules. Information relating to the set of network traffic rules is communicated from the host device to the client device. The communication between the client device and the host device using the first RAT is configured according to a set of client traffic rules that are based on the communicated information about the network traffic rules.

14 Claims, 5 Drawing Sheets

(58) Field of Classification Search
CPC ..... H04W 84/12; H04W 48/18; H04W 76/15; H04W 76/16
See application file for complete search history.

(56) References Cited

U.S. PATENT DOCUMENTS

| | | | |
|---|---|---|---|
| 2016/0353324 A1 | 12/2016 | Lee et al. | |
| 2017/0078922 A1* | 3/2017 | Raleigh | H04L 69/18 |
| 2019/0159227 A1* | 5/2019 | Talebi Fard | H04W 36/0011 |
| 2021/0051530 A1* | 2/2021 | Venkataraman | H04L 65/1069 |
| 2021/0105697 A1* | 4/2021 | Xu | H04W 76/16 |
| 2021/0258868 A1* | 8/2021 | Wong | H04W 4/029 |

FOREIGN PATENT DOCUMENTS

| | | |
|---|---|---|
| WO | 2019/032972 A1 | 2/2019 |
| WO | WO 2020/037666 | 2/2020 |

OTHER PUBLICATIONS

EP Office Action received for European Patent Application No. 20163410.2, mailed on Apr. 17, 2023, 7 pages.
European Search Report and Search Opinion received for EP Application No. 20163410.2, mailed on Aug. 20, 2020, 11 pages.
International Preliminary Report on Patentability received for PCT Patent Application No. PCT/EP2021/056644, mailed on Sep. 29, 2022, 11 pages.
International Search Report & Written Opinion for application No. PCT/EP2021/056644 mailed on Jul. 6, 2021.

\* cited by examiner

NETWORK COMMUNICATION THROUGH A HOST DEVICE

CROSS-REFERENCE TO RELATED APPLICATIONS

The present application is a 35 U.S.C. § 371 U.S. National Stage of PCT Application No. PCT/EP2021/056644, filed on Mar. 16, 2021, which claims priority to European Patent Application No. 20163410.2, filed on Mar. 16, 2020. The entire content of each of the aforementioned patent applications is incorporated herein by reference.

TECHNICAL FIELD OF THE DISCLOSURE

This disclosure concerns configuring communication between a client device and a host device using a first Radio Access Technology (RAT), in which the host device communicates with a base station of a network using a second RAT, to provide services of the network to or from the client device. A method, a computer program and a device for operating with a network (such a client or host device) are considered.

BACKGROUND TO THE DISCLOSURE

Existing functionality on some User Equipment (UE) devices of cellular networks allows the UE to act as a Wireless Local Area Network (WLAN) hotspot to provide Internet access via the cellular connection of the UE. Where the UE device is a user client terminal, this is commonly known as tethering, but alternatively the UE device may be designed for the specific purpose of providing a WLAN hotspot. For the purposes of the present disclosure, the UE device providing a WLAN hotspot is termed a host device. An application may be provided on the host device to provide appropriate functionality, for example.

Referring to FIG. 1, there is a schematically shown a known configuration for communicating between a client device and a network via a host device. This may be termed WLAN "offload". The client device 10 communicates with the host device 20 over a WLAN interface 15 (for example using IEEE 802.11ac protocol). The host device 20 communicates with a base station 30 of the network using a cellular interface 25. The cellular interface 25 may be based on a Long Term Evolution (LTE) or 4G protocol. The host device 20 uses a best effort bearer to communicate data to, from or for the client device 10. Optionally, the client device 10 may also communicate directly with the network via the base station 30 (or via another base station) using cellular interface 26.

In such systems, the host device 20 only makes itself available to act as a WLAN access point if it has a connection to the base station 30 over the cellular interface 25 meeting Quality of Service (QoS) criteria, for example as discussed in GB-2534388. The client device 10 may also use algorithms to decide whether to communicate via the host device 20 over WLAN interface 15 or directly to the network over cellular interface 26.

Cellular interfaces are improving, for example with the introduction of New Radio (NR) or 5G. These benefits are not necessarily gained when communicating between client devices and the network via a host device. Improving such communication, to realize potential advantages, is therefore desirable.

SUMMARY OF THE DISCLOSURE

Against this background, the present disclosure provides a method for configuring communication between a client device and a host device using a first Radio Access Technology (RAT) according to claim 1, a computer program as defined by claim 13 and a device for operating with a network in line with claim 14. Other preferred features are disclosed with reference to the claims and in the description below.

In specific embodiments, the host device communicates with a base station of a network using a second RAT, to provide services of the network to or from the client device. Where the term "communicate" is used herein, this may include transmission and/or reception of signals, information or both. In the preferred embodiment, the first RAT may be a Wireless Local Area Network (WLAN) RAT or a Personal Area Network (PAN) RAT (for instance, based on Bluetooth®) or even a different Wide Area Network (WAN) RAT (for example, 4G) and the second RAT may be a WAN RAT, such as a cellular network RAT (for example, based on 5G technology). In communication between the host device and the base station (over the second RAT), data traffic is distinguished in accordance with a set of network traffic rules (for example, network slicing rules). Information relating to the set of network traffic rules, for instance a UE Route Selection Policy (URSP) or information derived from the URSP, is communicated from the host device to the client device. Then, the communication between the client device and the host device using the first RAT is configured according to a set of client traffic rules. The client traffic rules are based on the information about the network traffic rules communicated from the host device. This may be implemented as a method, a computer program and/or or in hardware, for example, in or as the host device and/or client device.

The set of network traffic rules preferably comprises a mapping between at least one characteristic of the data traffic and a plurality of traffic types. The at least one characteristic of the data traffic may comprise one or more of: an application-related information for the data traffic; a traffic descriptor for the data traffic; a destination address and/or domain for the data traffic; an origin address and/or domain for the data traffic; a port number for the data traffic; a protocol information for the data traffic; a connection capability; a route selection descriptor; a route precedence; a session and service continuity mode information; a network slice information; a data network name; a protocol data unit session type; a time characteristic or criterion; and a location characteristic or criterion. The plurality of traffic types may correspond with network slices of the second RAT.

The set of client traffic rules may advantageously differentiate at least one parameter of the communication using the first RAT between different data traffic, to distinguish the data traffic thereby. Additionally or alternatively, the set of client traffic rules may identify at least one parameter of the communication using the first RAT. In either or both cases, examples for each of the at least one parameter include: a frequency band and/or channel; a bandwidth; a scheduling; a priority; and a Quality of Service (QoS).

The information relating to the set of network traffic rules may be communicated from the host device to the client device upon request from the client device to the host device. The request optionally indicates at least one characteristic of data traffic communicated using the first RAT, for example a QoS and/or a bandwidth. The host device may identify an incompatibility between the set of network traffic rules and the at least one characteristic of data traffic indicated by the request. For example, the host device may not have access to a network slice of the network corresponding with of data traffic characteristic indicated by the request. Then, the host device may request from the base station, an adjustment to the communication between the host device and the base station and/or the set of network traffic rules, based on the identified incompatibility.

The configuration of the communication over the first RAT may be achieved by communicating, between the client device and the host device, one or both of: the set of client traffic rules; and a selection of the set of client traffic rules from a stored plurality of sets of client traffic rules (for example, indicating that a specific, stored set of client traffic rules should be used).

The information relating to the set of network traffic rules, communicated from the host device to the client device may comprise the set of network traffic rules (for example, URSP), the set of client traffic rules (for example, WLAN parameters) or both.

The information relating to the set of network traffic rules is received at the client device from the host device. Optionally, further information relating to the set of network traffic rules may be received at the client device from a base station (such as the base station used by the host device) of the network using the second RAT. The information relating to the set of network traffic rules received from the host device and/or the further information relating to the set of network traffic rules received from the base station may be stored at the client device.

The client device may stores a plurality of sets of client traffic rules. Then, the client device and/or the host device may select a set of client traffic rules from the stored plurality of sets of client traffic rules. The communication between the client device and the host device using the first RAT may be configured according to the selected set of client traffic rules. Where information relating to the set of network traffic rules is communicated from a base station of the network to the client device using the second RAT, at least one set of client traffic rules may be based on the communicated information about the network traffic rules from the base station.

The client device may have one or more stored sets of client traffic rules prior to the information relating to the set of network traffic rules being communicated from the host device to the client device. When the information relating to the set of network traffic rules is communicated from the host device to the client device, this may be used to update the stored set of client traffic rules at the client device or it may be stored at the client device in addition to the one or more previously stored sets of client traffic rules.

BRIEF DESCRIPTION OF THE DRAWINGS

The approach of the disclosure may be put into practice in various ways, one of which will now be described by way of example only and with reference to the accompanying drawings in which.

Where a drawing indicates a feature also shown in another drawing, identical reference numerals have been used.

DETAILED DESCRIPTION OF ONE OR MORE PREFERRED EMBODIMENTS

Figure 1:
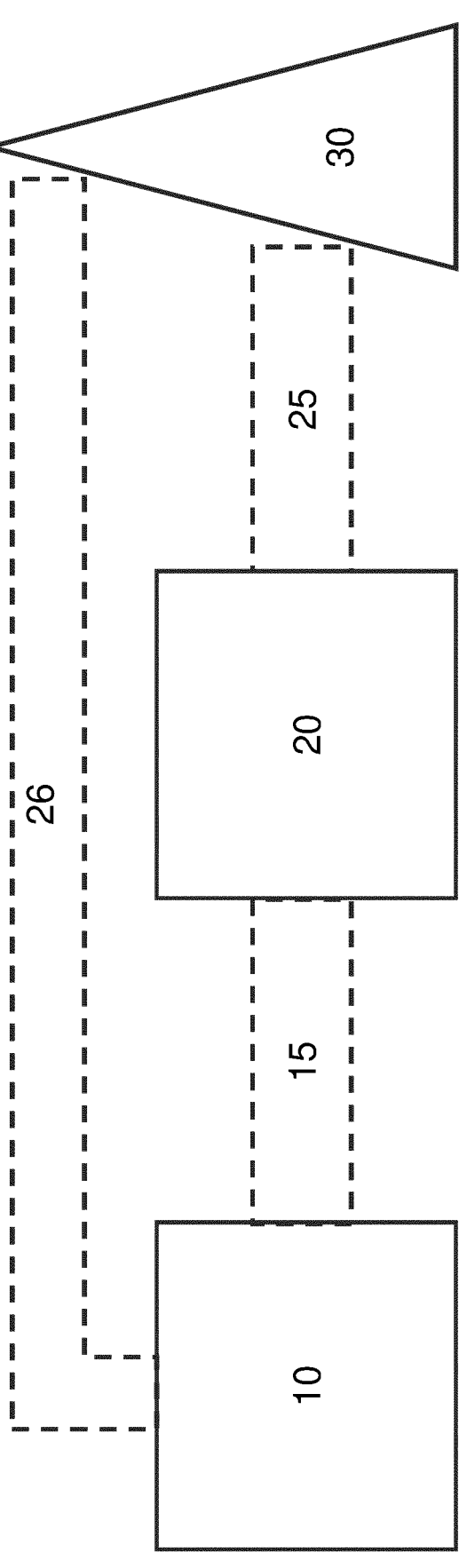
FIG. 1 schematically shows a known configuration for communicating between a client device and a network via a host device.

Reference is again made to FIG. 1, in which there is a schematically shown a configuration for communicating between a client device and a network via a host device. An analysis of a 3GPP Traffic Flow Template (TFT) is performed to create a mapping between an Internet Protocol (IP) 5-tuple (including: source IP address, destination IP address, source port number, destination port number, and protocol type) and a desired bearer for use over the cellular interface 25, for example as defined in 3GPP TS 24.008, section 10.5.6.12 (and/or other standards and specifications).

For uplink, a mapping between data communicated over the WLAN interface 15 and a QoS Class Identifier (QCI) to be used by the host device 20 over the cellular interface 25 is performed. Conversely for downlink, a mapping between data to be communicated over the WLAN interface 15 and a QoS Class Identifier (QCI) used by the host device 20 over the cellular interface 25 is performed.

The host device 20 communicates with the base station 30 over the cellular interface 25 using a best effort bearer. Also, low latency features may be used, if supported by the host device 20. This approach allows a certain amount of network slicing to be carried over the WLAN interface 15. However, developments to improve network slicing over cellular interfaces, particularly in 5G technology mean that this approach will not allow full benefit over network slicing to be obtained when a client device communicates with a network through a host device.

5G network slicing allows greater customisation and better differentiation of traffic than is possible in 4G (LTE). To allow network slicing to be extended to client devices communicating through a host device, a number of desiderata can be considered: slice information to distributed to client devices, even outside of the normal coverage footprint of the cellular network; creation of a link between the client device and host device that offers an extended enhanced performance, to enable slicing over this link; activation of slice capabilities on the host device, even if it is not normally subscribed to the capability, allowing it to carry the sliced traffic of the client; and enhanced behaviour in the case that the 5G network tries to prevent WLAN offloading for traffic of a particular application.

Figure 2:
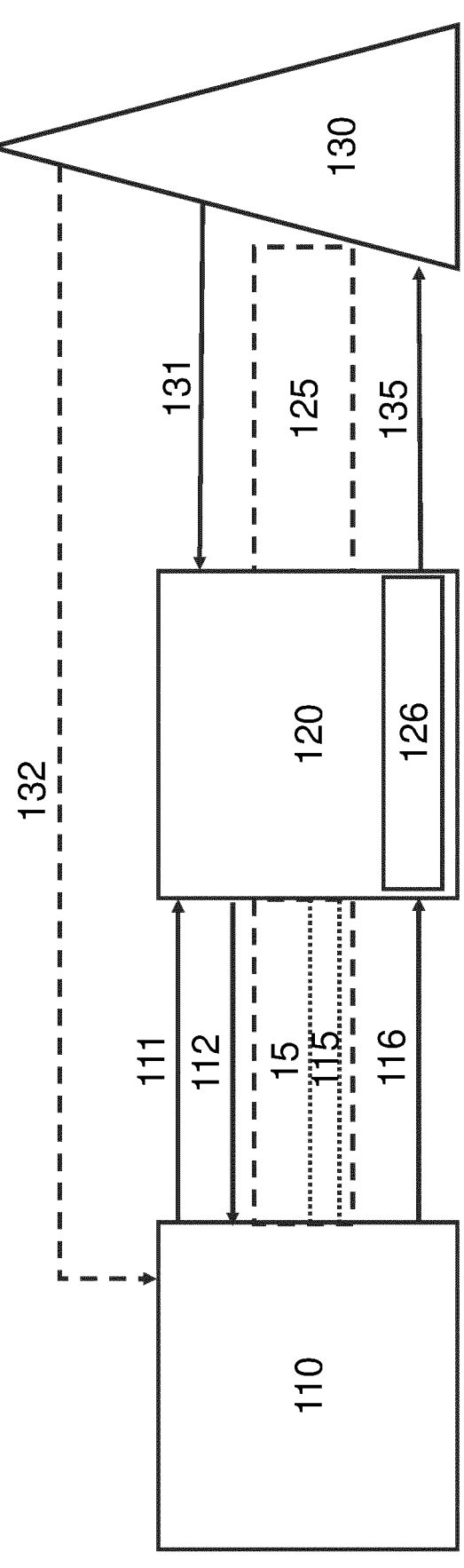
FIG. 2 schematically depicts a configuration and first method for communicating between a client device and a network via a host device according to the disclosure.

Referring now to FIG. 2, there is schematically depicted a configuration and first method for communicating between a client device and a network via a host device according to the disclosure. As in the previous drawing, the configuration comprises: a client device 110; a host device 120; and a base station of the network 130. The client device 110 communicates with the host device 120 via a WLAN interface 15 and the host device 120 communicates with the base station 130 via a cellular network RAT interface 125 (which may be a 5G or NR RAT interface, for instance). As part of the communication via the cellular network RAT interface 125, the host device 120 is subscribed to one or more network slices (as defined in 3GPP TS 28.801 and/or other standards and specifications). Optionally, the client device 110 also communicates with the base station 130 (or another base station) via a cellular network RAT interface (not shown).

In a method according to the disclosure, the client device 110 makes a request 111 for URSP support information from the host device 120. The request 111 may be a simple request for any information or it may provide details about the services and/or applications using data traffic at the client device 110. Optionally, the request can indicate URSP information already present at the client device 110. The URSP provides a mapping between IP traffic characteristics and network slices, for example as defined in 3GPP TS 29.507 and TS 23.503 (see for example, section 6.6.2.1 of v. 16.3.0) and/or other standards and specifications. In response to the request 111, the host device 120 provides URSP information 112 (for example, the URSP or information based on the URSP) to the client device 110. The URSP information is provided from the base station 130 to the host device 120 using standard communication 131 of the cellular network RAT interface 125.

The host device 110 may then create, select or otherwise define a mapping 115 between data traffic for communication over the WLAN interface 15 (in particular based on the URSP network slicing information) and one or more parameters of the WLAN interface 15. These may use scheduling or prioritisation and/or segregation of transmissions on the WLAN interface 15 (for example, based on a frequency band and/or channel, bandwidth, QoS or other identifier). Prioritisation can be use one or more of an internal scheduler-defined prioritisation, mapping to DSCP priorities for the link (for instance), channel queue and channel segregation. In this way, the client device 110 and host device 120 may recreate equivalent slice prioritisations across the WLAN interface 15 to those between the host device 120 and the base station 130.

The mapping 115 may correspond with a set of client traffic rules, applied at the client device 110 and/or the host device 120 for traffic over the WLAN interface 15. The host device 120 typically determines the mapping 115 and communicates the mapping 115 to the client device 110, but the client device 110 could determine the mapping 115 and communicate the mapping 115 to the host device 120 or the mapping 115 could be agreed in a distributed way. The mapping 115 may be set by a selection of pre-stored mappings and the communication of this selection from the client device 110 to the host device 120. The mapping 115 is advantageously stored at both the client device 110 and the host device 120.

The client device 110 can then map any application usage requests for the appropriate slice to the host device 120 using the mapping 115, which then maps to the network defined standard slice over the cellular network RAT interface 125, using a URSP mapping 126.

The data traffic is then communicated 116 between the client device 110 and the host device 120 over the WLAN interface 15 using the mapping 115 and communicated 135 between the host device 120 and the base station 130 over the cellular network RAT interface 125 using the URSP mapping 126. The network slicing over the cellular network RAT interface 125 is implemented by additional identifiers indicating a logic for processing the data traffic at the network.

In this way, the client device 110 and/or host device 120 can determine the mapping 115 between network slicing of the cellular network RAT interface 125 and parameters of the WLAN interface 15 based on the URSP information received from the host device 120. Optionally, the client device 120 may receive URSP information 132 directly from the base station 130 (or another base station of the cellular network) and the mapping 115 can be determined using this received URSP information 132. In such cases, the received URSP information 112 from the host device 120 and/or the received URSP information 132 from the network may be used to update existing stored URSP information at the client device 110 or the client device 110 may store multiple sets of URSP information (for either or both of the routes from the host device 120 and the network) and when new URSP information is received, this may be stored in addition to the existing stored information. The client device 110 may also conduct a best candidate evaluation process, to determine whether to communicate data traffic with the network via the host device 120 or directly without the need for the host device 120 (for instance, via the base station 130).

In general terms, there may be considered an approach (for example a method) for configuring communication between a client device and a host device using a first RAT (for instance, WLAN). The host device communicates with a base station of a network using a second RAT (for instance a cellular network RAT, for example, NR or 5G), to provide services of the network to or from the client device. In some embodiments, the second RAT is different from the first RAT. The communication between the host device and the base station distinguishes data traffic in accordance with a set of network traffic rules (for example, a URSP or network slicing configuration). The approach comprises: communicating, from the host device to the client device, information relating to the set of network traffic rules (for instance, the URSP or data based on the URSP); and configuring the communication between the client device and the host device using the first RAT, according to a set of client traffic rules (for example, rules for differentiating traffic over the first RAT) that are based on the communicated information about the network traffic rules. Approaches in accordance with the disclosure may be implemented as a method, a computer program (which may be embodied on a computer readable medium), for example configured when operated by a processor to perform an approach according to the disclosure and/or as a device for operating with a network (for instance a client device or a host device). The device may be configured to communicate using a first RAT and/or a second RAT (for example, different from the first RAT) and may be arranged to operate in accordance with an approach according to the disclosure. As noted above, the term "communicate" as used herein may include transmission and/or reception of the relevant signals and/or information.

The set of network traffic rules typically comprises a mapping between at least one characteristic of the data traffic and a plurality of traffic types. For instance (and in accordance with a URSP as defined in 3GPP TS 23.503 and/or other standards and specifications), the at least one characteristic of the data traffic comprises one or more of: an application-related information for the data traffic; a traffic descriptor for the data traffic; a destination address and/or domain for the data traffic; an origin address and/or domain for the data traffic; a port number for the data traffic; a protocol information for the data traffic; a connection capability; a route selection descriptor; a route precedence; a session and service continuity mode information; a network slice information; a data network name; a protocol data unit session type; a time characteristic or criterion; and a location characteristic or criterion. The information relating to the set of network traffic rules may comprise one or both of: the set of network traffic rules (for example, the host device may communicate the URSP to the client device); and the set of client traffic rules, which are based on the set of network traffic rules (for instance, the host device may work out the parameters of the first RAT based on the URSP and transmits just those and not necessarily the URSP).

The set of client traffic rules (which may be considered as the client or host device telling the other which parameters of the first RAT to use) may differentiate at least one parameter of the communication using the first RAT between different data traffic, to distinguish the data traffic thereby. Additionally or alternatively, the set of client traffic rules may identify at least one parameter of the communication using the first RAT. In either or both cases, each of the at least one parameter may comprise one of: a frequency band and/or channel; a bandwidth; a scheduling; a priority; and a Quality of Service, QoS.

Preferably, the information relating to the set of network traffic rules received from the host device is stored at the client device. Additionally or alternatively, information relating to the set of network traffic rules is received from the base station (or another base station) using the second RAT at the client device and this is optionally stored at the client device.

The approach may further comprise communicating, from the client device to the host device, a request for information relating to the set of network traffic rules. The step of communicating information relating to the set of network traffic rules from the host device to the client device may then be made in response to the request.

Configuring may comprise communicating between the client device and the host device one or both of: the set of client traffic rules; and a selection of the set of client traffic rules from a stored plurality of sets of client traffic rules.

In some embodiments, the client device has at least one stored set of client traffic rules prior to the step of communicating information relating to the set of network traffic rules from the host device to the client device. For instance, the client may be pre-programmed with these rules (for example, WLAN parameters) or the client device may have received the rules from somewhere else previously. In embodiments, the stored set of client traffic rules at the client device may be updated, based on the information relating to the set of network traffic rules communicated from the host device. Alternatively, the set of client traffic rules that are based on the communicated information relating to the set of network traffic rules may be stored in addition to the at least one set of client traffic rules stored prior to the step of communicating information relating to the set of traffic rules from the host device to the client device.

In embodiments, the client device stores a plurality of sets of client traffic rules. Then, configuring may comprise selecting a set of client traffic rules from the stored plurality of sets of client traffic rules. Advantageously, the communication between the client device and the host device using the first RAT is configured according to the selected set of client traffic rules. As noted above, Information relating to the set of network traffic rules may be communicated from a base station of the network to the client device using the second RAT. In that case, at least one set of client traffic rules of the plurality of sets of client traffic rules may be based on the communicated information about the network traffic rules from the base station.

Figure 3:
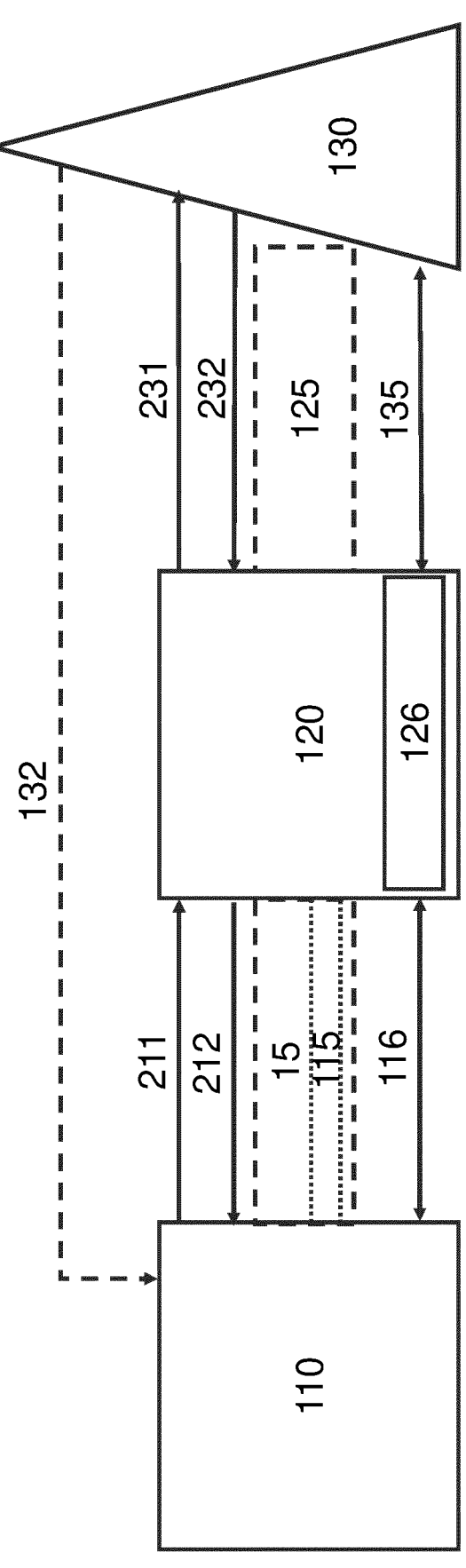
FIG. 3 schematically illustrates a configuration and second method for communicating between a client device and a network via a host device according to the disclosure.

Next, reference is made to FIG. 3, in which there is schematically illustrated a configuration and second method for communicating between a client device and a network via a host device according to the disclosure. The configuration of the client device 110, the host device 120 and the base station of the network 130 is the same as shown in FIG. 2, but the procedure implemented between the client device 110, the host device 120 and the base station 130 may vary.

Initially, a network slice information request 211 is communicated from the client device 110 to the host device 120. The network slice information request 211 indicates a network slice for use by data traffic between the client device 120 and the network and/or one or more parameters of the data traffic that would allow the host device 120 to determine an appropriate network slice.

The host device 120 identifies that it not subscribed to the required network slice. It is therefore triggered to communicate a network slice temporary access request 231 to the base station 130. The base station 130 responds with a slice enablement response 232. The slice enablement response 232 can authorise or reject the temporary access request 231. To determine the slice enablement response 232, the network slice temporary access request 231 is reviewed by the network (for example, checking that the host device 120 is trusted and/or if satisfactory performance can be assured based on the host device 120). If the review indicates a positive result, the authorisation of the requested slice is made on the network and the host device 120 is notified in the slice enablement response 232.

Based on the slice enablement response 232, the host device 120 then provides URSP information or slice support information 212 to the client device 120. In this way, the support is then relayed to the client device 110 for inclusion in its best candidate evaluation process. The procedure discussed above (with reference to FIG. 2) is then followed, for: determining the mapping 115; communicating 116 the data traffic between the client device 110 and the host device 120 over the WLAN interface 15 using the mapping 115; and communicating 135 the data traffic 135 between the host device 120 and the base station 130 over the cellular network RAT interface 125 using the URSP mapping 126.

Figure 4:
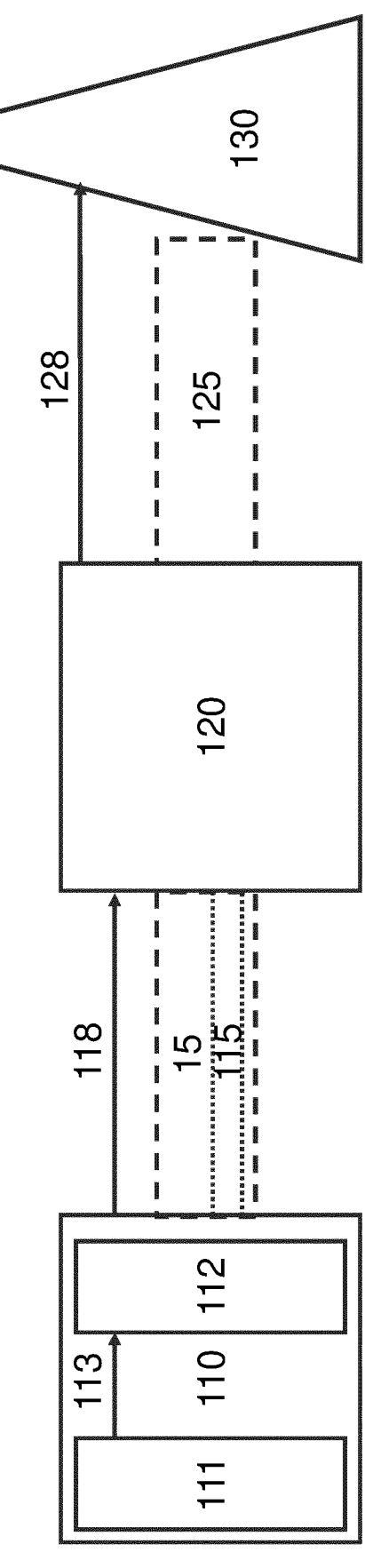
FIG. 4 schematically shows an example of uplink traffic flow from a client device to a network via a host device according to the disclosure.

A brief description of uplink and downlink traffic flow between applications on the client and the network service will now be provided. Referring to FIG. 4, there is schematically shown an example of uplink traffic flow from a client device 110 to a network via a host device 120. With the client device 110, there is provided: an application 111, using higher layers of the communication protocol stack; and a communications interface 112, using lower layers of the communication protocol stack. The application 111 generates data traffic 113, which is sent to the communications interface 112. The communications interface 112 uses standard URSP metrics to understand the desired slice type or profile. The communications interface 112 may choose to send the data traffic 113 to the network directly or to send the data traffic 113 to the network via the host device 120. The communications interface 112 uses the determined mapping 115 to send the data traffic 118 to the host device 120 using the WLAN interface 15. The host device 120 receives the data traffic 118 and relays the data traffic 128 to the base station 130, over the cellular network RAT interface 125, using the slice type defined in the URSP equivalent to the mapping 115.

Figure 5:
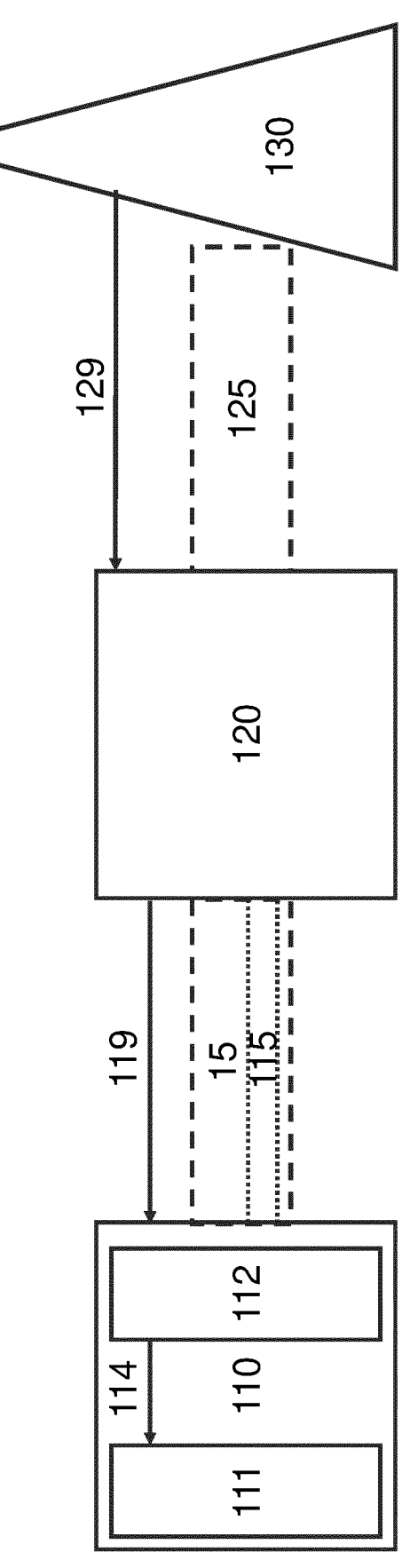
FIG. 5 schematically shows an example of downlink traffic flow to a client device from a network via a host device according to the disclosure.

Now referring to FIG. 5, there is schematically shown an example of downlink traffic flow to a client device 110 from a network via a host device 120. Data traffic 129 is mapped to a network slice at the base station 130. The mapping infers parameters for relaying the data traffic 129 from the host device 120 to the client device 110, such as low latency. The host device 120 receives the data traffic 129 and relays the data traffic 119 to the client device 110 over the WLAN interface 15. This uses the mapping 115 between the slice type defined in the URSP and one or more parameters of the WLAN interface 15. The communications interface 112 of the client device 110 receives the data traffic 19 and sends the relayed data traffic 114 to the application 111.

The network may indicate a restriction in the URSP for certain applications or certain traffic flows not to use a WLAN "offload", that is not to communicate with the client device 110 via the host device 120. For the purposes of approaches according to the present disclosure, the mapping 115 does not implement such a restriction, but rather treats the WLAN interface 15 between the client device 110 and the host device 120 as a normal connection and not as a WLAN connection.

Returning to the general terms of the approach according to the disclosure discussed above, in embodiments, the request may indicate at least one characteristic of data traffic used to provide the services of the network to or from the client device via the host device using the first RAT. In that case, an incompatibility between the set of network traffic rules and the at least one characteristic of data traffic indicated by the request may be identified at the host device. An adjustment to the communication between the host device and the base station and/or the set of network traffic rules may then be requested from the host device to the base station. The adjustment may be based on the identified incompatibility. In particular, the incompatibility may comprise a lack of access by the host device to a network slice of the network, for example when the network slice corresponds with the at least one characteristic of data traffic indicated by the request.

Although specific embodiments have now been described, the skilled person will understand that various modifications and variations are possible. Also, combinations of any specific features shown with reference to one embodiment or with reference to multiple embodiments are also provided, even if that combination has not been explicitly detailed herein.

Specific modifications and variations in alternative embodiments will now be discussed. For example, although a WLAN interface has been considered above, the skilled person would understand that alternative Local Area Network (LAN), Personal Area Network (PAN) or similar RATs may be considered, such as Bluetooth®. In addition, the WLAN interface could be replaced by a Wide Area Network (WAN) interface, such as a cellular network architecture, for instance, a 4G (or LTE) interface. In particular, this interface (termed the first RAT above) will typically not have the same traffic differentiation (for instance, slice information) as the 5G interface (or more generally, the second RAT), but a mapping corresponding to that differentiation can be provided according to the present disclosure.

Similarly, whilst a 5G cellular network RAT has been considered above, other possibilities may be considered based on other wireless network architectures, for example using network slicing. Network slicing has been discussed herein as a preferred approach for traffic differentiation, but it will be understood that other types of traffic differentiation may be employed and a mapping provided over the first RAT of the host device accordingly, in particular for alternative second RAT architectures.

Whilst the first and second RATs may be different, embodiments in which the first and second RATs are the same may be conceived. This may result in a more intelligent repeater, offering different capabilities for different client devices at the same time.

It may be understood that more than one client device may communicate with the network through a single host device. Additionally or alternatively, the host device may have multiple options for a first RAT (equivalently, multiple first RATs, for instance of the types discussed above) and different client devices may communicate with the host device using different RATs.

The invention claimed is:

1. A method for configuring communication between a client device and a host device using a first Radio Access Technology (RAT), the host device communicating with a base station of a network using a second RAT, to provide services of the network to or from the client device, the communication between the host device and the base station distinguishing data traffic in accordance with a set of network traffic rules, the method comprising:

communicating, from the host device to the client device, information relating to the set of network traffic rules, the information relating to the set of network traffic rules comprising a User Equipment Selection Policy (URSP), data based on a URSP, or a network slicing configuration, wherein the client device stores a plurality of sets of client traffic rules that are based on the communicated information about the network traffic rules;

selecting a set of the client traffic rules from the stored plurality of sets of client traffic rules; and configuring the communication between the client device and the host device using the first RAT, according to the selected set of client traffic rules, wherein the second RAT is different from the first RAT.

2. The method of claim 1, wherein the set of network traffic rules comprises a mapping between at least one characteristic of the data traffic and a plurality of traffic types.

3. The method of claim 2, wherein the at least one characteristic of the data traffic comprises one or more of:

an application-related information for the data traffic;

a traffic descriptor for the data traffic;

a destination address and/or domain for the data traffic;

an origin address and/or domain for the data traffic;

a port number for the data traffic;

a protocol information for the data traffic;

a connection capability; a route selection descriptor;

a route precedence;

a session and service continuity mode information;

a network slice information; a data network name; a protocol data unit session type;

a time characteristic or criterion; and a location characteristic or criterion.

4. The method of claim 1, wherein the selected set of client traffic rules:

differentiate at least one parameter of the communication using the first RAT between different data traffic, to distinguish the data traffic thereby; and/or identify at least one parameter of the communication using the first RAT; and wherein each of the at least one parameter comprises one of:

a frequency band and/or channel;

a bandwidth;

a scheduling; a priority; and a Quality of Service, QoS.

5. The method of claim 1, further comprising:

communicating, from the client device to the host device, a request for information relating to the set of network traffic rules and the step of communicating information relating to the set of network traffic rules from the host device to the client device being in response to the request.

6. The method of claim 5, wherein the request indicates at least one characteristic of data traffic used to provide the services of the network to or from the client device via the host device using the first RAT.

7. The method of claim 6, further comprising:

identifying, at the host device, an incompatibility between the set of network traffic rules and the at least one characteristic of data traffic indicated by the request; and requesting, from the host device to the base station, an adjustment to the communication between the host device and the base station and/or the set of network traffic rules, based on the identified incompatibility.

8. The method of claim 7, wherein the incompatibility comprises a lack of access by the host device to a network slice of the network, the network slice corresponding with the at least one characteristic of data traffic indicated by the request.

9. The method of claim 1, wherein one or more of:

the step of configuring comprises communicating between the client device and the host device one or both of:

the plurality of sets of client traffic rules; and/or the information relating to the set of network traffic rules comprises one or both of:

the set of network traffic rules; and the plurality of sets of client traffic rules;

the method further comprises storing, at the client device, the information relating to the plurality of sets of network traffic rules received from the host device and/or information relating to the plurality of sets of network traffic rules received at the client device from the base station using the second RAT.

10. The method of claim 1, further comprising:

communicating information relating to the set of network traffic rules from a base station of the network to the client device using the second RAT, at least one set of client traffic rules of the plurality of sets of client traffic rules being based on the communicated information about the network traffic rules from the base station.

11. The method of claim 1, wherein the client device has at least one stored set of client traffic rules of the plurality of sets of client traffic rules prior to the step of communicating information relating to the set of network traffic rules from the host device to the client device, the method further comprising:

updating the stored set of client traffic rules at the client device, based on the information relating to the set of network traffic rules communicated from the host device; or storing the set of client traffic rules that are based on the communicated information relating to the set of network traffic rules in addition to the at least one set of client traffic rules stored prior to the step of communicating information relating to the set of traffic rules from the host device to the client device.

12. The method of claim 1, wherein the first RAT is a Wireless Local Area Network RAT and the second RAT is a 5G RAT.

13. A non-transitory computer readable storage medium having stored thereon computer executable instructions that, when executed by a processor, cause a computer to configure communication between a client device and a host device using a first Radio Access Technology (RAT), the host device communicating with a base station of a network using a second RAT to provide services of the network to or from the client device, the communication between the host device and the base station distinguishing data traffic in accordance with a set of network traffic rules, the computer caused to perform the following:

communicate, from the host device to the client device, information relating to the set of network traffic rules, the information relating to the set of network traffic rules comprising a User Equipment Selection Policy (URSP), data based on a URSP, or a network slicing configuration, wherein the client device stores a plurality of sets of client traffic rules that are based on the communicated information about the network traffic rules;

selecting a set of the client traffic rules from the stored plurality of sets of client traffic rules; and configure the communication between the client device and the host device using the first RAT, according to the selected set of client traffic rules, wherein the first RAT is different from the second RAT.

14. A computing device:

a processor; and a non-transitory computer readable storage medium having stored thereon computer executable instructions that, when executed by the processor, cause the computing device to configure communication between a client device and a host device using a first Radio Access Technology (RAT), the host device communicating with a base station of a network using a second RAT to provide services of the network to or from the computing device, the communication between the host device and the base station distinguishing data traffic in accordance with a set of network traffic rules, the computing device caused to perform the following:

communicate, from the host device to the client device, information relating to the set of network traffic rules, the information relating to the set of network traffic rules comprising a User Equipment Selection Policy (URSP), data based on a URSP, or a network slicing configuration, wherein the client device stores a plurality of sets of client traffic rules that are based on the communicated information about the network traffic rules;

selecting a set of the client traffic rules from the stored plurality of sets of client traffic rules; and configure the communication between the client device and the host device using the first RAT, according to the selected set of client traffic rules, wherein the first RAT is different from the second RAT.

* * * * *